Patented Mar. 4, 1924.

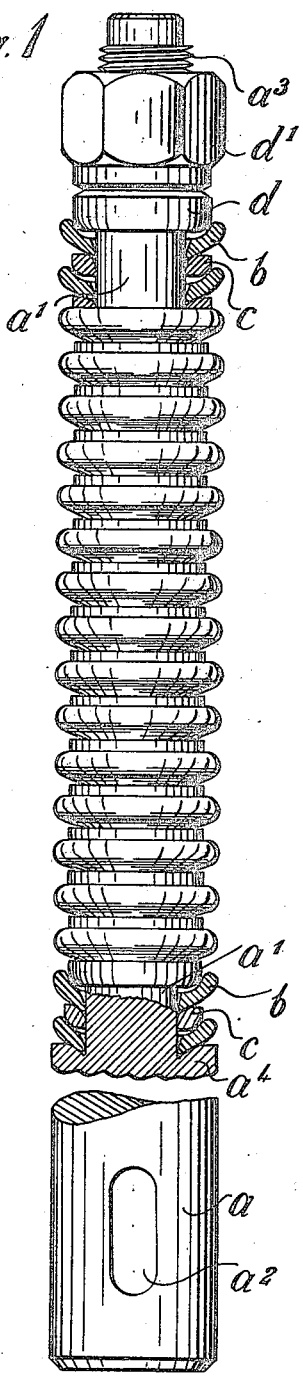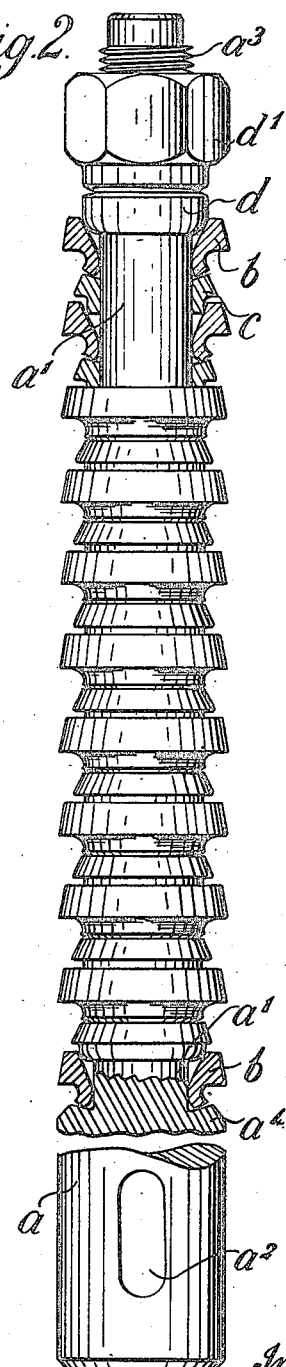

1,485,652

UNITED STATES PATENT OFFICE.

JAMES WAKEFIELD AND ERNEST HENRY COWGILL, OF DERBY, ENGLAND, ASSIGNORS TO ROLLS ROYCE LIMITED, OF DERBY, ENGLAND.

CUTTING AND BURNISHING BROACH.

Application filed March 20, 1922. Serial No. 545,246.

*To all whom it may concern:*

Be it known that we, JAMES WAKEFIELD, of Derby, England, and ERNEST HENRY COWGILL, of Derby, England, both British subjects, have invented certain new and useful Improvements in Cutting and Burnishing Broaches, of which the following is a specification.

This invention comprises an improved burnishing or cutting broach for finishing the machining of holes in metal articles.

As well known, the surfaces and cutting edges of burnishing or cutting broaches wear comparatively rapidly which necessitates the constant replacement of the tool, and the object of the present invention is to construct a broach of which the burnishing surfaces or cutting edges can be expanded radially, thus securing two main advantages namely, the extension of life of the tool and the attainment of accurate adjustment to secure fine limits of size of the hole.

According to this invention the broach consists of rings or circular members with the burnishing surfaces or cutting edges formed on their outer circumferences, said rings or members being threaded on a metal bar so shaped as to be expansible on lateral or axial pressure being applied thereto, means being also provided for applying the required pressure.

In the accompanying drawings are shown two examples of the invention, Fig. 1 being a sectional elevation of a burnishing broach and Fig. 2 a similar view of a cutting broach.

In the forms shown in both figures the conical rings have burnishing surfaces and cutting edges respectively, and the washers necessarily differ in shape, but otherwise the operation thereof is the same in both instruments so far as this invention is concerned.

The mandrel or bar on which the rings and washers are threaded is formed of two diameters $a$ being the larger and $a^1$ the smaller part. $a^2$ is a machined slotted hole for use in anchoring the device to the broaching machine. On the smaller part $a^1$ of the mandrel are arranged burnishing or cutting rings $b$ (Fig. 1) and $b'$ (Fig. 2) and washers $c$ (Fig. 1) and $c'$ (Fig. 2), the foremost ring abutting against a shoulder $a^4$ on the mandrel which is suitably shaped to receive and facilitate the expansion of the ring. The washers $c$ $c'$ and the rings $b$ $b'$ where the latter abut on the washers $c$ or $c'$ respectively are so shaped that they cause or facilitate as far as possible the expansion of the rings radially when subjected to axial pressure. Each side of each washer $c$ or $c'$ projects into and abuts against the conical interior of one adjacent ring $b$ or $b'$ and against the exterior of the other ring and as to the former at a suitable radial distance from the axis to produce the expanding effect desired. $d$ designates a terminal washer and $d^1$ an adjusting nut co-operating therewith and internally threaded to engage the thread $a^3$ on the mandrel by means of which nut axial pressure can be applied to all the rings and washers and the rings caused within limits to flatten and expand radially.

The outer diameters of the burnishing and cutting rings $b$ $b'$ are graduated, the smallest ring being arranged at the larger end of the mandrel, but this graduation need not be necessarily uniform from one end to the other.

With tools constructed as above described, by expanding the rings $b$ or $b'$ the following advantages are obtained:—firstly a fine adjustment for size can be secured, secondly the wear of the burnishing surface or cutting edge can be compensated for and the life of the tool lengthened and thirdly where the limit of expansion of the rings has been reached efficiency and accuracy can be restored by substituting new rings wholly or in part.

What we claim as our invention and desire to secure by Letters Patent of the United States is:—

1. A tool for machining holes in metal consisting of a mandrel, a plurality of metal rings, threaded on said mandrel and having their outer circumferences formed with machining edges, said rings being so shaped that they can expand radially by application of pressure thereto and means for applying axial pressure to said metal rings.

2. A tool as claimed in claim 1, having interposed between the metal rings alternately metal washers smaller in diameter than the parts of the rings on which the machining edges are formed, said rings and washers being respectively so shaped and juxtaposed that on axial pressure being applied thereto the rings are caused to expand radially.

3. A tool as claimed in claim 1 having conical shaped metal rings provided on their outer circumferences with machining edges and threaded on the mandrel and interposed between said rings alternately metal washers smaller in diameter than the interior of the larger ends of the conical rings, said washers being shaped so that each of same projects into and impinges upon the inner circumference of a ring at one side thereof and abuts against the outside of the ring at the other side.

4. A tool as claimed in claims 1 and 2, in which the mandrel is in the form of a bar having two diameters, the larger end forming a shoulder for the foremost ring to abut against and the smaller end terminating in a threaded part, a washer and a threaded nut cooperating therewith engaging said threaded end, and such washer forming a shoulder or stop for the end ring or washer whereby on screwing up the nut, axial pressure is brought to bear on all said rings and washers.

In witness whereof we have signed this specification in the presence of two witnesses.

JAMES WAKEFIELD.
ERNEST HENRY COWGILL.

Witnesses:
NORMAN H. WALKER,
VIOLET M. MASTERS.